(12) United States Patent
Coe

(10) Patent No.: US 8,992,118 B2
(45) Date of Patent: Mar. 31, 2015

(54) PAVEMENT REPAIR SYSTEM UTILIZING SOLID PHASE AUTOREGENERATIVE COHESION

(71) Applicant: William B. Coe, Wrightwood, CA (US)

(72) Inventor: William B. Coe, Wrightwood, CA (US)

(*) Notice: Subject to any disclaimer, the term of this patent is extended or adjusted under 35 U.S.C. 154(b) by 61 days.

(21) Appl. No.: 13/842,640

(22) Filed: Mar. 15, 2013

(65) Prior Publication Data
US 2014/0270955 A1  Sep. 18, 2014

(51) Int. Cl.
| | | |
|---|---|---|
| *E01C 7/18* | (2006.01) | |
| *E01C 21/00* | (2006.01) | |
| *E01C 23/10* | (2006.01) | |
| *E01C 11/00* | (2006.01) | |
| *E01C 19/15* | (2006.01) | |
| *E01C 23/14* | (2006.01) | |

(52) U.S. Cl.
CPC ............. *E01C 23/10* (2013.01); *E01C 11/005* (2013.01); *E01C 19/15* (2013.01); *E01C 23/14* (2013.01)
USPC .......................................................... 404/77

(58) Field of Classification Search
USPC ..................................................... 404/75, 77
IPC .............................................. E01C 7/18,21/00
See application file for complete search history.

(56) References Cited

U.S. PATENT DOCUMENTS

| | | | |
|---|---|---|---|
| 2,704,967 A | 3/1955 | Rostler | |
| 3,262,375 A | 7/1966 | Eigenmann | |
| 3,513,005 A * | 5/1970 | Bradshaw et al. | 427/138 |
| 3,801,212 A | 4/1974 | Cutler | |
| 3,807,886 A | 4/1974 | Cutler | |
| 4,021,393 A * | 5/1977 | McDonald | 524/64 |
| 4,085,078 A * | 4/1978 | McDonald | 524/62 |
| 4,113,401 A | 9/1978 | McDonald | |
| 4,261,669 A | 4/1981 | Edo | |
| 4,358,554 A | 11/1982 | Yan et al. | |
| 4,594,022 A | 6/1986 | Jeppson | |
| 4,765,772 A | 8/1988 | Benedetti et al. | |

(Continued)

FOREIGN PATENT DOCUMENTS

| | | |
|---|---|---|
| CN | 101058970 A | 10/2007 |
| DE | 3631121 | 4/1987 |

(Continued)

OTHER PUBLICATIONS

PCT International Search Report and Written Opinion of the International Searching Authority for PCT International Application No. PCT/US2014/026755 with International Filing Date Mar. 13, 2014.

*Primary Examiner* — Gary Hartmann
(74) *Attorney, Agent, or Firm* — Knobbe Martens Olson & Bear LLP

(57) ABSTRACT

A method for repairing an aged or damaged asphalt pavement is provided. The method involves preparing a surface of the aged or damaged asphalt pavement by filling in deviations from a uniform surface plane with dry aggregate and compacting the dry aggregate; applying a reactive asphalt emulsion to the prepared surface; and passing an emitter over the prepared pavement, wherein the emitter generates electromagnetic radiation having a wavelength of from 2-5 mm that penetrates into the pavement to a depth of at least 2 inches. The asphalt pavement is repaired by disturbing voids and interstices in the damaged pavement without dehydrogenation of the asphalt, such that oligomers present in the aged asphalt are linked together into longer polymer chains to improve ductility of the aged asphalt.

7 Claims, 4 Drawing Sheets

(56) References Cited

U.S. PATENT DOCUMENTS

| | | | |
|---|---|---|---|
| 4,854,771 | A | 8/1989 | Corbin, Jr. et al. |
| 4,863,309 | A | 9/1989 | Corbin, Jr. et al. |
| 4,969,772 | A | 11/1990 | Chiba et al. |
| 4,994,508 | A | 2/1991 | Shiraki et al. |
| 5,092,706 | A | 3/1992 | Bowen et al. |
| 5,242,493 | A | 9/1993 | Glynn, Jr. et al. |
| 5,248,407 | A | 9/1993 | Bardet et al. |
| 5,251,999 | A | 10/1993 | McCracken |
| 5,344,485 | A | 9/1994 | Glynn, Jr. |
| 5,385,426 | A | 1/1995 | Omann |
| 5,397,389 | A | 3/1995 | Glynn, Jr. |
| 5,445,473 | A | 8/1995 | Chaverot et al. |
| 5,556,225 | A | 9/1996 | Marino |
| 5,599,133 | A | 2/1997 | Costello et al. |
| 5,911,817 | A | 6/1999 | Hayner |
| 6,012,870 | A | 1/2000 | Dillingham |
| 6,217,252 | B1 | 4/2001 | Tolliver et al. |
| 6,346,561 | B1 | 2/2002 | Osborn |
| 6,414,056 | B1 | 7/2002 | Puzic et al. |
| 6,439,806 | B1 | 8/2002 | Dillingham |
| 6,492,439 | B2 | 12/2002 | Wollum et al. |
| 6,554,531 | B2 | 4/2003 | Bodish |
| 6,759,453 | B2 | 7/2004 | Jelling et al. |
| 6,805,738 | B2 | 10/2004 | Tasaki |
| 7,316,521 | B2 | 1/2008 | Shiomoto et al. |
| 7,402,619 | B2 | 7/2008 | Stephens |
| 7,517,934 | B2 | 4/2009 | Deeter et al. |
| 7,534,068 | B2 | 5/2009 | Brouillette et al. |
| 7,696,267 | B2 | 4/2010 | Sasagawa et al. |
| 7,985,787 | B2 | 7/2011 | Martin |
| 8,138,242 | B2 | 3/2012 | Reinke et al. |
| 8,808,445 | B2 * | 8/2014 | Coe .............................. 106/277 |
| 8,926,742 | B2 * | 1/2015 | Coe .............................. 106/277 |
| 2003/0026653 | A1 | 2/2003 | Crupi |
| 2004/0057794 | A1 | 3/2004 | Corcoran |
| 2004/0240939 | A1 | 12/2004 | Hays et al. |
| 2005/0004273 | A1 | 1/2005 | Chun et al. |
| 2006/0229390 | A1 | 10/2006 | Chun et al. |
| 2006/0241218 | A1 | 10/2006 | Kim et al. |
| 2009/0087262 | A1 | 4/2009 | Tucker et al. |
| 2009/0226254 | A1 | 9/2009 | Jones |
| 2011/0034594 | A1 | 2/2011 | Scholten et al. |
| 2011/0129296 | A1 | 6/2011 | Van Velsor |
| 2011/0143066 | A1 | 6/2011 | Roddy |
| 2011/0243661 | A1 | 10/2011 | Baumgardner et al. |
| 2011/0250016 | A1 | 10/2011 | Giles |
| 2011/0274487 | A1 | 11/2011 | Sylvester |
| 2012/0213584 | A1 | 8/2012 | Reinke et al. |
| 2012/0301222 | A1 | 11/2012 | Laffey |

FOREIGN PATENT DOCUMENTS

| | | | |
|---|---|---|---|
| JP | 05-148815 | A | 6/1993 |
| JP | 10-147766 | | 6/1998 |
| JP | 2000-144629 | | 5/2000 |
| JP | 2002-161509 | | 6/2002 |
| KR | 10-2002007868 | | 10/2002 |
| KR | 10-0599492 | | 7/2006 |
| KR | 10-0697032 | | 3/2007 |
| KR | 10-0821238 | B1 | 4/2008 |
| KR | 10-0993406 | | 11/2010 |
| KR | 10-1253598 | | 4/2013 |
| KR | 10-1254955 | | 4/2013 |
| KR | 10-1254956 | | 4/2013 |

* cited by examiner

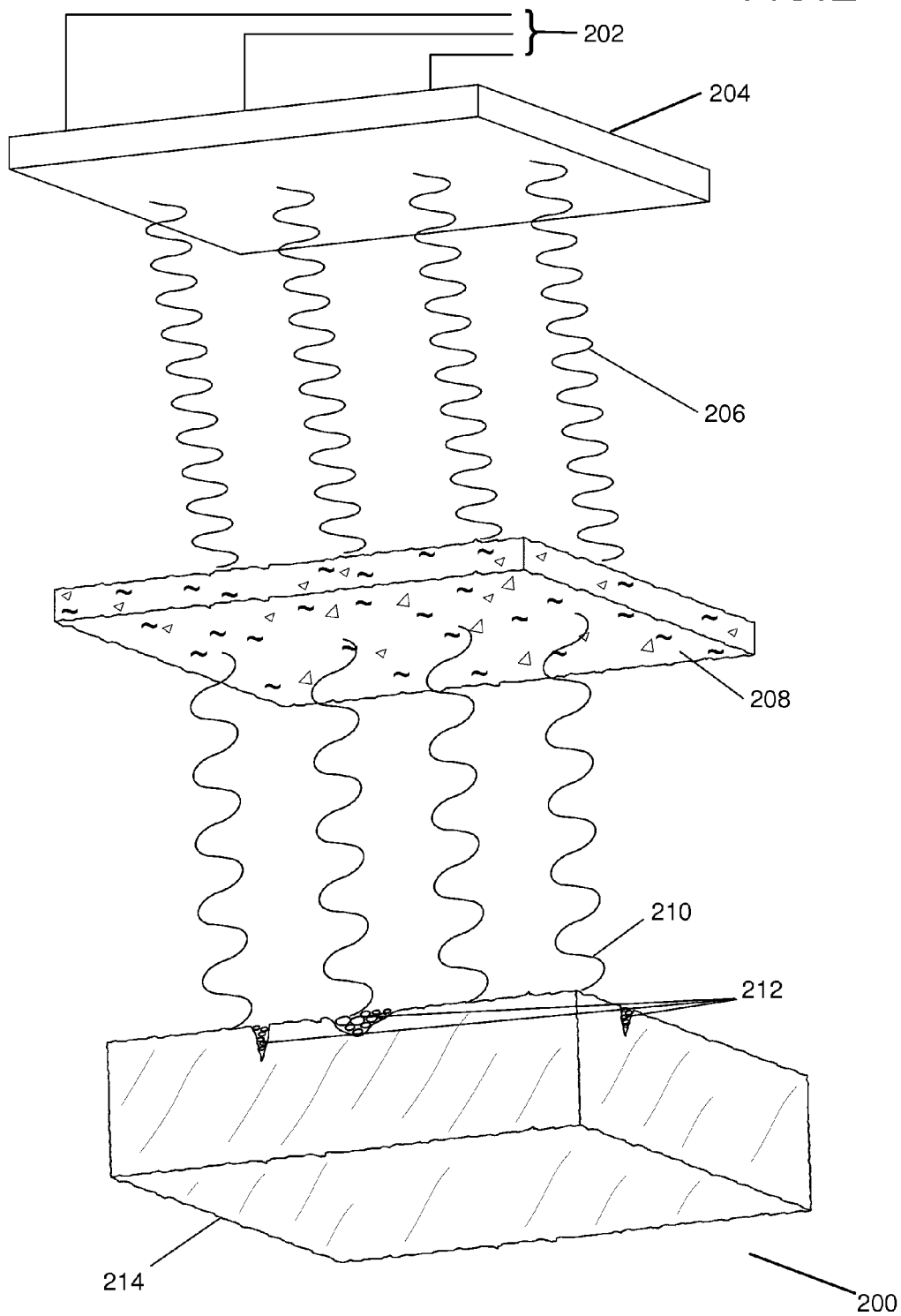

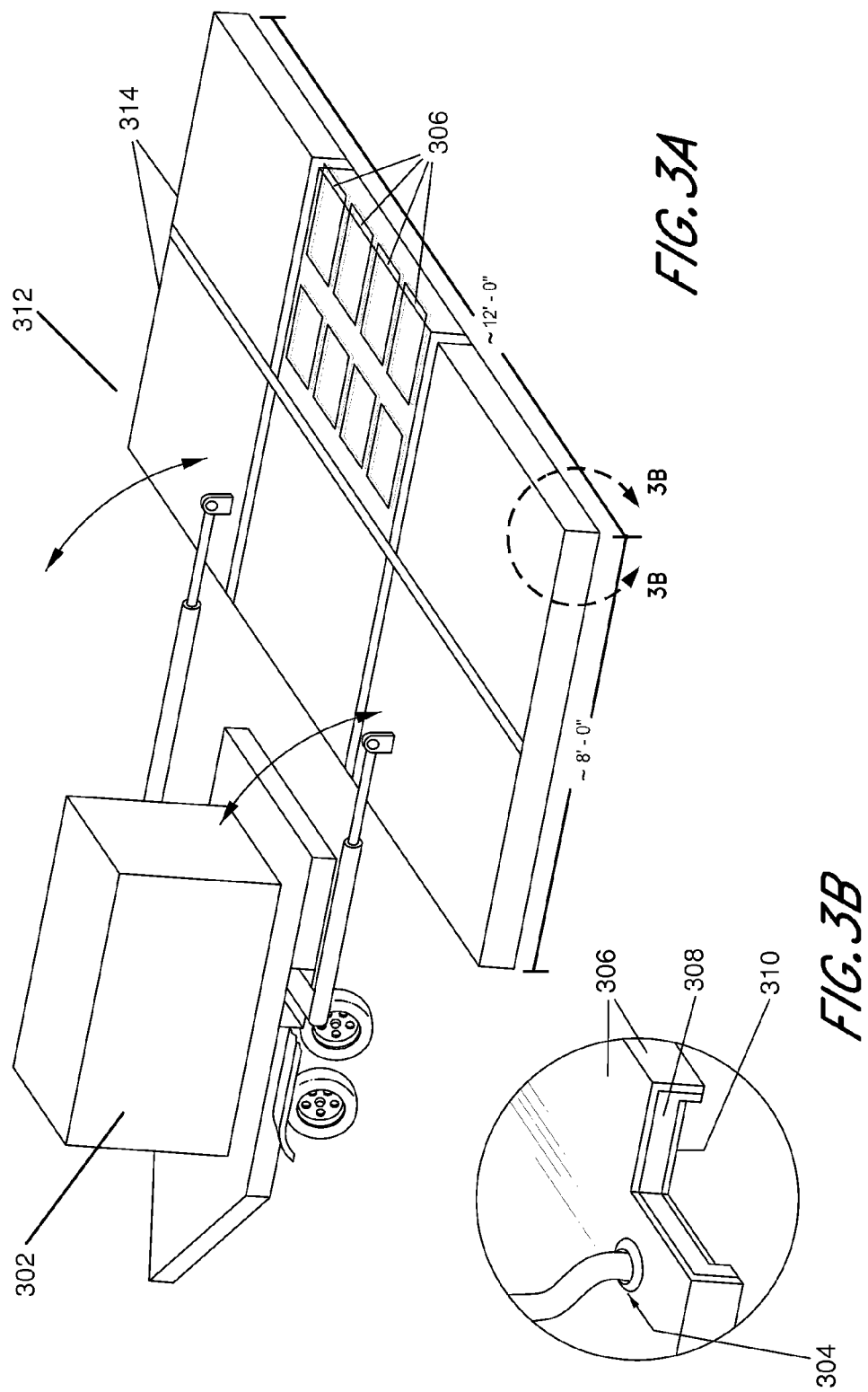

PAVEMENT REPAIR SYSTEM UTILIZING SOLID PHASE AUTOREGENERATIVE COHESION

FIELD OF THE INVENTION

A pavement repair system is provided utilizing Solid Phase Auto Regenerative Cohesion (SPARC) Homogenization by Liquid Asphalt Oligopolymerization (HALO) technologies ("the SPARC-HALO system"). The SPARC-HALO system is suitable for use in repairing asphalt pavement, including pavement exhibiting a high degree of deterioration (as manifested in the presence of potholes, cracks, ruts, or the like) as well as pavement that has been subject to previous repair and may comprise a substantial amount of dirt and other debris (e.g., chipped road paint or other damaged or disturbed surfacing materials). The HALO system itself is suitable for rejuvenating aged asphalt, thereby improving properties of the paving material.

BACKGROUND OF THE INVENTION

Repair and maintenance of the civil infrastructure, including roads and highways of the United States presents great technical and financial challenges. The American Association of State Highway Transportation Officials (AASHTO) issued a bottom line report in 2010 stating that $160 billion a year must be spent to maintain infrastructure; however, only about $80 billion is being spent. The result is a rapidly failing infrastructure. New methods of maintaining existing roads and new methods of constructing roads that would extend the useful life for the same budget dollar are needed to meet the challenges of addressing our failing infrastructure.

In the United States alone there are approximately 4.4 million center lane miles of asphalt concrete, with a center lane comprising a 24 foot wide pavement surface having a lane in each direction. Asphalt concrete paving surfaces are typically prepared by heating aggregate to 400° F., and applying liquid asphalt (e.g., by spraying into a pug mill or drum coating) to yield a mixture of 95% aggregate and 5% asphalt. If a temperature of approximately 350° F. is maintained for the mixture, it is considered hot mix asphalt and does not stick to itself as long as the temperature is maintained. The hot mix asphalt is typically placed in a transfer truck, which hauls it to the job site, where it is placed on either a gravel road base or onto an old road surface that has been previously primed. A paving apparatus receives the hot mix asphalt from the transfer truck and spreads it out uniformly across the base surface, and as the material progressively cools below 250° F. degrees it is compacted with a roller. The hot mix asphalt is rolled to a uniform density, and after approximately one to three days of cooling and aging the surface can be opened to traffic.

After such asphalt pavement has been in place for several years, the pavement progressively ages. Water works its way into the pavement. It begins to lose its integrity on the surface, causing aggregate at the surface of the pavement to be lost. The pavement surface roughens as aggregate is lost, and cracks begin to form. Conventional pavement repair techniques at this stage in the deterioration process include: pouring hot rubber asphalt into the cracks, using cold patch (a polymer-modified cold mix asphalt that can be applied to a damaged road surface, e.g., placed in a pothole, under ambient temperature conditions using hand tools). Another technique for repairing pavement exhibiting minimal damage involves application of a liquid asphalt emulsion to the pavement surface so as to provide a degree of waterproofing to slow the aging process, or, for surfaces exhibiting more deterioration, application of a thin layer of a slurry of aggregate and asphalt emulsion over the top of the pavement.

Preparing and installing hot asphalt pavement involves running aggregate through a heat tube (typically at around 400° F.) where moisture is driven off to prevent boil over when the rock contacts molten asphalt. The aggregate is added to asphalt, optionally containing a rubber polymer. The aggregate is sent through a mill having high velocity tines that rolls the aggregate through a spray of asphalt. The resulting mixture of aggregate with baked-on asphalt typically comprises 95% aggregate and 5% asphalt (optionally with rubber polymer). The mixture exits the mill at about 350° F. and is transported into waiting trucks (e.g., a belly dump truck) which are driven to the job site. New pavement is laid down over an earthen base covered with gravel that has been graded and compacted. Typically, the new road is not laid in a single pass. Instead, a first 2-3 inch lift of loose hot asphalt is laid down and partially compacted, and then a second lift is laid over the first and compacted. The temperature of the asphalt concrete pavement at this stage is typically about 140° F. Additional lifts can be added as desired, e.g., to a depth of approximately 12 inches, depending upon the expected usage conditions for the road (heavy or light transportation, the velocity of traffic, desired lifetime). Primer or additional material is typically not put between layers of lift in new construction, as the fresh pavement exhibits good adherence to itself in new construction. New construction design typically never requires any primer or additional material between the subsequent lifts.

After approximately fifteen years of exposure to the elements, it becomes cost prohibitive to attempt to maintain asphalt pavement via conventional cold patching, waterproofing, and slurry techniques. The conventional approach at this stage in the deterioration of the pavement typically involves priming the damages surface and applying a layer of hot mix asphalt. For pavement too deteriorated for application priming and application of a layer of hot mix asphalt, a cold-in-place recycling process can be employed. In cold-in-place recycling, typically the topmost 2 to 5 inches of the damaged road surface are pulverized down to a specific aggregate size and mixed with an asphalt emulsion, and then re-installed to pave the same road from which the old paving material has been removed.

Existing pavement (asphalt or concrete) is typically repaired by use of an overlay, e.g., a mixture of aggregate and asphalt such as described above for new road construction. In the case of repaving over the top of rigid concrete, some type of primer is typically applied, e.g., as a spray resulting in application of approximately 10 gallons of primer per 1,000 square feet of pavement. The primer can be an asphalt emulsion that provides a tacky surface for the new overlay. A single layer of overlay can be applied, or multiple layers, typically two or more.

Cracks and stresses in a repaired underlying road bed will quickly imprint themselves on new overlays of paving material, due to the malleability of the new asphalt under rolling loads. As the underlying road bed undergoes expansion and contraction under ambient condition, cracks can be telegraphed up through as much as three inches of overlying asphalt. A conventional method for achieving some resistance to the telegraphing of old defects in the underlying road bed is to put down a hot tack coat of asphalt, lay a polypropylene mat (similar in appearance to spun-bond polypropylene, typically ¼-½ inches in thickness, available as Petromat® from Nilex, Inc. of Centennial, Colo.) over the hot tack coat of asphalt, followed by a layer of new hot asphalt concrete which is then compacted over the existing surface. This will inhibit the rate of telegraphing of cracks to a limited extent, such that instead of taking place from 6 months to 2 years after repair, the cracks do not telegraph for from to 1 year to 3 years after repair. This telegraphing phenomenon by the defects in an existing aged roadbed manifest surface defects in a new pavement overlay about three times sooner than is common to a fresh asphalt concrete pavement placed on a compacted earthen and gravel base; as is the practice in new construction.

Deterioration mechanisms of new highways have been investigated over a 20 year life cycle. Overlays are typically applied between the twelfth and fifteenth year. Typically, no significant deterioration is observed over the first five years of a well-built highway. Within the first five years, cracks or potholes typically do not appear unless there is acute damage to the pavement, or loose material underneath the pavement. After the first five years, physical symptoms of deterioration are observed, including lateral and longitudinal cracks due to shrinkage of the pavement mass through the loss of binder and embrittlement of the asphalt. Cracks ultimately result in creation of a pothole. Ravelling is a mechanism wherein the effects of exposure to water and sun break down the adhesion between the rock on the top surface of the pavement and the underlying aggregate, such that small and then larger rock is released from the pavement. A stress fracture is where the pavement, for one reason or another, may not have been thick enough to withstand exposure to an extremely heavy load, moisture, or poor compaction underneath. When combined with shrinkage of the asphalt itself as it goes through heating and cooling cycles, and application of oxidative stress, stress fractures can also result. Stress fractures are characterized by extending in different directions (unlike the lateral or longitudinal cracking as described above).

The macro-texture of a pavement refers to the visible roughness of the pavement surface as a whole. The primary function of the macro-texture is to help maintain adequate skid resistance to vehicles travelling at high speeds. It also provides paths for water to escape which helps to prevent wheels of motor vehicles from hydroplaning. This optionally may be accomplished through cutting or forming grooves in existing or new pavements. Micro-textures refer to the roughness of the surface of the individual stones within the asphalt concrete pavement. It is the fine texture that occurs on chippings and other exposed parts of the surfacing. For concrete pavement this is usually the sand and fine aggregates present at the surface layer and for asphalt it is usually associated with the type of aggregates used. Micro-texture creates frictional properties for vehicles travelling at low speeds. The wet skid resistant nature of a road is dependent on the interaction of the tire and the combined macro-texture and micro-texture of the road surface.

Conventional repair of shallow surface fissures and ravelling uses various methods. Re-saturants are materials that soften old asphalt. They are typically mixed with an emulsion and sprayed onto the surface of the old pavement. The material penetrates into the uppermost 20 or 30 mils of the pavement and softens the asphalt, imparting flexibility. Thermally fluidized hot asphalt can also be sprayed directly onto the surface, which hardens and provides waterproofing. A fog seal is typically sprayed on the surface, and can be provided with a sand blotter to improve the friction coefficient. In a chip seal, a rubberized emulsion can also be sprayed onto the aged pavement, and then stone is broadcast into the rubberized emulsion which then hardens, bonding the stone. Slurry seal employs a cold aggregate/asphalt mixture prepared in a pug mill and placed on the aged pavement surface, but is applied in a much thinner layer, e.g., 0.25-0.75 inches. Once the pavement surface is repaired, any safety markings can be repainted.

The Federal Highway Administration, through the National Academy of Sciences, has done research into pavement durability. A 20-year long-term paving program (LTPP) was initiated in 1984 in an attempt to understand the failure mechanisms of paving. At the end of the 20-year program and after five years of data analysis, better ways have been developed for measuring pavement failure, the most noteworthy being the Strategic Highway Research Program (SHRP) grading system. The SHRP system can be used to determine the physical qualities of an asphalt product and its potential for long-term service. Subsequently, mechanical testing was developed to determine when the ductility and flexibility of the pavement was diminished, which correlates with end of its useful life as well as the chemical changes in the asphalt itself over time were studied. The presence of carboxylates and sulfoxides that are generated over the life of the pavement cross-section was discovered to be associated with asphalt embrittlement. This discovery now enables prediction of useful life. Accelerated weathering chambers also can be employed to determine the rate of formation of these telltale carboxylates and sulfoxides in a new binder system, binder/aggregate combination, or other paving material thereby predicting an expected useful life. In terms of the chemistry of deterioration, study data indicate that asphalt pavement fails because it becomes brittle. Embrittlement leads to mass loss, which leads to shrinkage, which produces cracks. Cracks become potholes, the pavement stops flexing, and aggregate becomes dislodged.

Deterioration of asphalt binder is generally associated with asphalt beyond the first 100 microns covering the rock surface. An asphalt layer on aggregate at depths within 100 microns of the asphalt/rock interface was found by the 20 year LTDP study to have not experienced the presence of sulfoxides and carboxylates that are associated with embrittlement. Therefore the properties of that asphalt were similar to those of virgin asphalt initially placed on the rock. While not wishing to be bound by theory, it is believed that the tight bond of the asphalt within the first 100 microns of the rock surface exhibited a high degree of intimacy. This intimacy inhibits the movement of scavenging oxidizers into the asphalt structure, thereby minimizing deterioration. Accordingly, it is believed that in an aged paving material averaging 95% aggregate and 5% asphalt, a 100 micron layer of good asphalt surrounds each aggregate particle, with embrittled asphalt in between. It is this "embrittlement zone" where ductility is lost and failure takes place. Air gaps in the cross-section of the pavement can allow water and air to gain access to the asphalt rock interface. Over a period of time, the asphalt goes from being flexible to becoming brittle. The chemistries associated with the embrittlement are related to the formation of sulfoxide or hydroxyl groups, and typically there is a loss of a hydrogen atom on the carbon (oxidation) which causes the key molecular structures to become shorter, thereby less flexible. Once that happens, the pavement becomes inflexible, cracks open up, the pavement loses mass, and rolling loads break up the pavement, causing cracking, potholes, running, ravelling, and block cracking, each resulting in a loss of the pavement integrity.

The conventional methods for repair of surface defects inclusive of rejuvenators and fog seals typically do not exhibit a desirable lifespan. The most durable conventional repair, a slurry seal or a chip seal, may last only 7 or 8 years. An analysis of pavement failure mechanisms provides an explanation for the poor lifespan observed for new asphalt pavement and subsequent repairs. The primary factor is that the repairs do not remedy the underlying embrittlement of the asphalt binder deep within the pavement cross-section. The embrittlement results from the scissioning of the polymer chains present in the asphalt under the influence of free radicals associated principally with water. Water penetrates the pavement, and sunlight and traffic over the pavement surface provides energy for reaction with oxygen and other pavement components, yielding sulfoxide and carboxylate reaction products and reduced polymer chain length through reaction with the resulting free radicals. Loss of polymeric molecular weight impacts the ability of the pavement to stretch and flex. A secondary failure mechanism is loss of rock itself due to hydrolytic attack of the asphalt-rock interface. Rocks typically comprise metal oxides (e.g., calcium oxide, silicon dioxide, lithium oxide, potassium oxide, sodium oxide). Hydroxide groups can form upon exposure to water, resulting in oxidative reactions that impair the adhesion of asphalt to the rock surface, a process referred to as stripping.

Loss of waterproofing typically is a top down mechanism. The asphalt breaks down from exposure to heavy load and the sun, causing water to penetrate between the asphalt and rock. The asphalt can lose its hydrophobicity, with paraffinic components being broken down into more hydrophilic components, which in turn accelerate the process of water adsorption. Ravelling occurs, resulting in a loss of macrotexture. Ultimately, the microtexture of the surface is lost due to abrasion of tires across the surface rubbing off the asphalt and polishing the rock surface, whereby the coefficient of friction drops to unacceptable levels. Typically, a brand new pavement will have a coefficient of friction of between 0.6 and 0.7. Over time, loss of microtexture and ultimately macrotexture results in the coefficient of friction dropping to below about 0.35, at which point the pavement becomes inherently unsafe in terms of steer resistance in the presence of water. Even if a pavement surface doesn't have ravelling or cracking, it can still be unsafe to drive on due to loss of adequate surface texture. Microtexture and macrotexture mechanisms function at different speeds. Typically, up to about 45 mph the microtexture controls stopping distance. Between 45 and 50 the macrotexture begins to have a greater effect on stopping distance, and above 50 mph the macrotexture is the principal determining factor in stopping distance.

Accordingly, there are a variety of maintenance techniques that can be employed on damaged asphalt pavement, some of them more successful than others in preserving and extending the useful life of the pavement. It is known that for pavement that is timely and properly maintained, and repaired in the early stages of deterioration, the typical useful life can be extended out to 19 or 20 years. However, in the current economic environment, the conventional approach to road maintenance is to fix the most often travelled pavement first, and then repair, as budgets allow, progressively the better pavement, such that a useful life closer to 12 or 13 years is typically observed.

SUMMARY OF THE INVENTION

A method for repairing asphalt pavement is desirable that is both inexpensive when compared to conventional techniques, while yielding a paving surface having an equally long or longer useful life when compared to asphalt pavement repaired by conventional techniques. A method is also provided for rejuvenating aged asphalt so as to bring its paving properties closer to that of virgin pavement.

A composition and method for repairing pavement, that exhibits an improved lifespan when compared to conventional methods is desirable. Such a composition can result in improved binding between the asphalt and rock. Such a composition can also impart improved resistance to mechanical stress and shearing (e.g., from rolling loads that operate at an angle of incidence). The compositions are configured to modulate the failure mechanisms of the pavement, so as to impart improved waterproofing, maintenance of microtexture, maintenance of macrotexture, resistance to embrittlement, resistance to delamination, and resistance to mechanical stress. These improved properties greatly extend the lifetime of the pavement beyond that which would be observed for a conventional new pavement or a conventional repair method on existing pavement.

DESCRIPTION OF THE DRAWINGS

FIG. 2 provides a schematic view of a HALO emitter of one embodiment employed in the SPARC-HALO system to cure a SPARC elastomer over a damaged pavement in a SPARC-HALO elastomer/emitter sequence 200. The emitter includes an AC power source 202 and a HALO emitter panel 3-15 W/in$^2$ (power density) and emits radiation of a variable wavelength: mid IR-terahertz 206. The radiation is applied to SPARC elastomer with varying concentrations of aggregate (Δ) and wavesplitting particles (~) 208. Radiation of variable wavelength: long IR-terahertz 210 passes through to an old pavement cross section 214 having dry weld treated defects therein 212.

FIG. 3A provides a schematic view of a portable HALO device and FIG. 3B provides detail of the interior of an emitter panel module of the portable HALO device. The HALO device is powered by a 200 KVA Tier IV Gen-Set 302. The device includes an array of ~4'×4' modules 314 of adjustable height 312 (frame not shown). Each module includes (8) 12"×24" emitter panels 306 per module, emitting 1000-400 Watts/panel. The array is 96 S.F. and emits 192000 Watts of radiation. Electrical connection(s) 304 from the emitter panel to control panel and generator are provided. The emitter panel includes a metal shell 306, rigid ceramic insulation 308, and an embedded emitter panel 310.

DETAILED DESCRIPTION OF THE PREFERRED EMBODIMENT

Figure 1A:
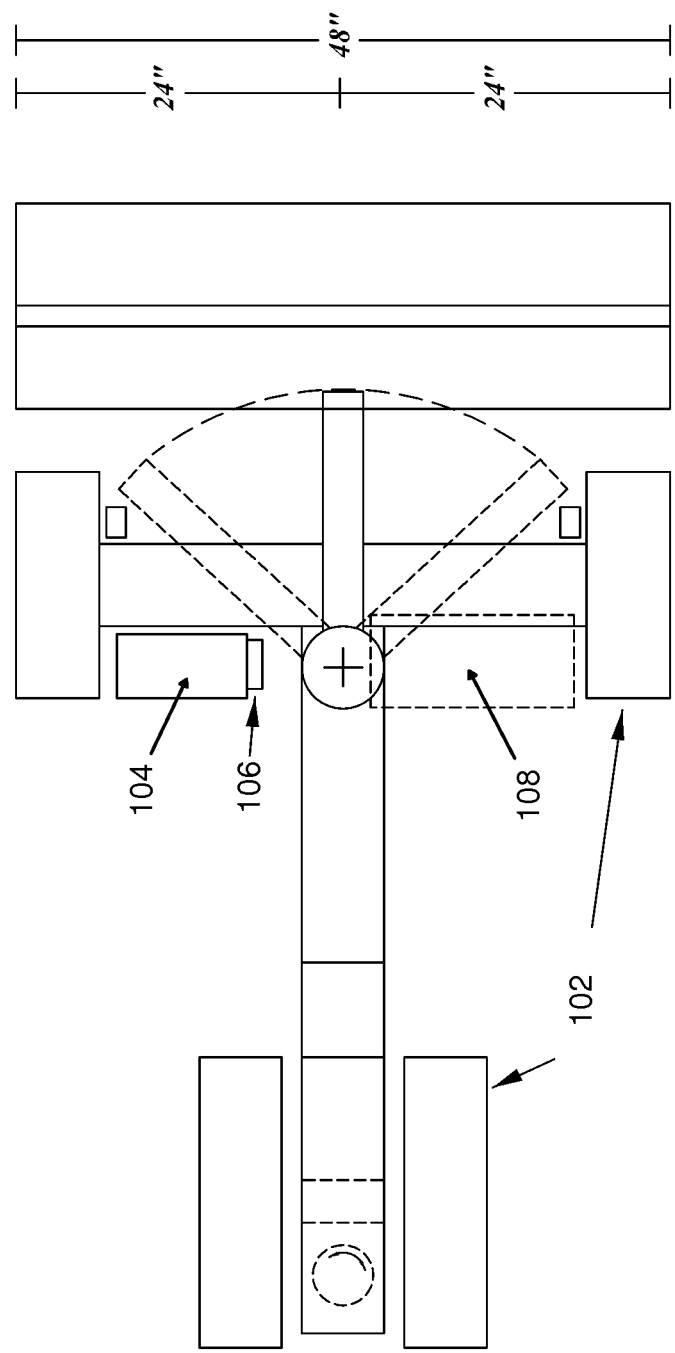
FIG. 1A provides a top view of an apparatus for applying aggregate and reactive emulsion to paving surface to be repaired.
Figure 1B:
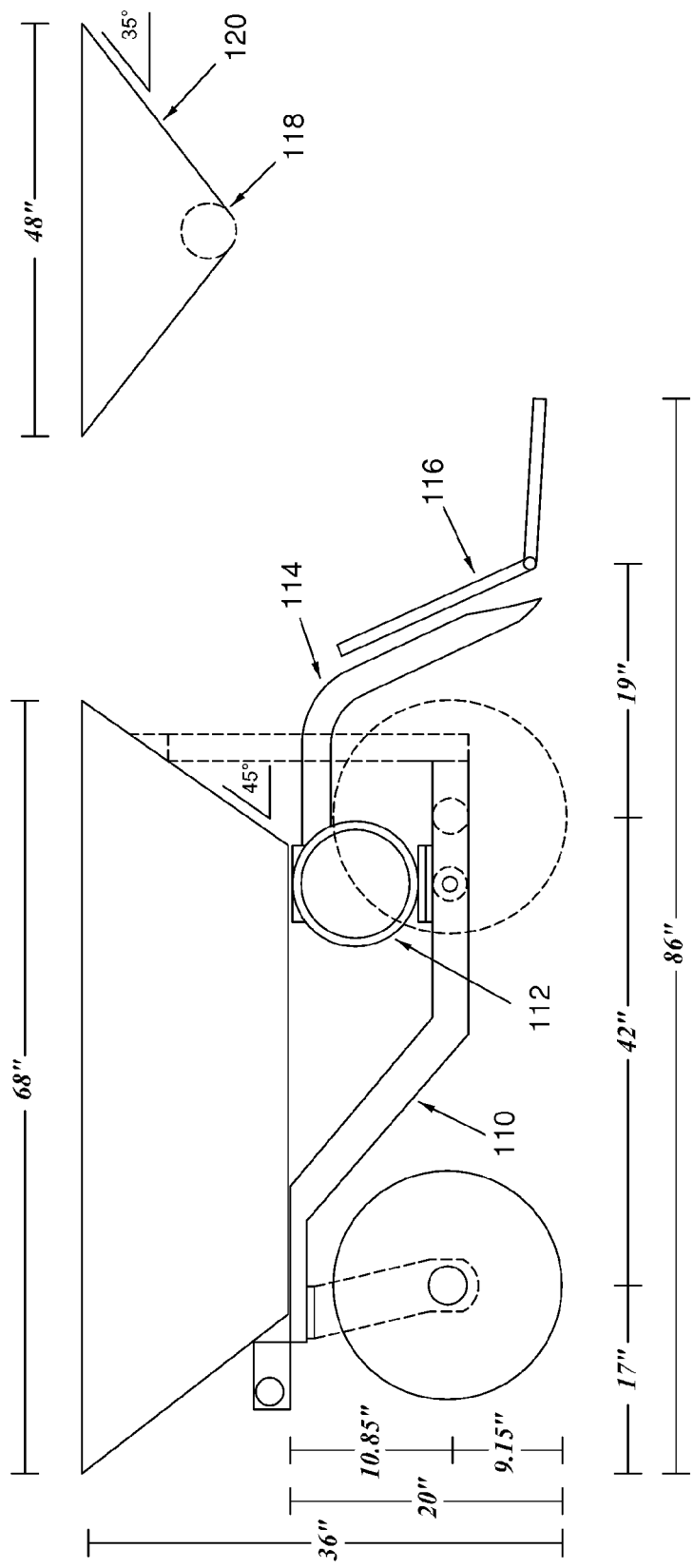
FIG. 1B provides a side and front view of the apparatus of FIG. 1A. An airpot adhesive tank is not depicted. Electric power and compressed air can be provided to the apparatus by a support unit, not depicted. The hopper is loaded with a heated aggregate, and the apparatus is configured to move at a speed of 20 feet per minute, with a maximum speed of delivery of aggregate of 75 feet per second. The apparatus includes: $3/16 \times 4" \times 6"$ box tubing 110; a 7" dia. stone accelerator wheel housing 112; a 3" dia. oscillating stone accelerator tube 303/304 SS 114; an adjustable heated screed knife and plate assembly 303/304 SS 116; a 6" hopper screw ASM 118; and a 0.4 C.Y. hopper 12GA 303/304 SS 120.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Contrary to conventional methods, the SPARC-HALO system paving repair methods not only repair the pavement to a uniform surface with paving properties similar or superior to conventional asphalt paving, but also change the character of the underlying deteriorated road bed to minimize or eliminate the telegraphing of cracks. This character of the underlying pavement is a function of, e.g., the starting composition of the road, how the road was initially manufactured, exposure of the road to ambient conditions and different loads over time, and prior repair processes.

Dry Aggregate Preparation Stage

The initial stage in the SPARC-HALO pavement repair system involves a preparatory stage where deviations from a uniform surface plane (e.g., potholes, divots, cracks, grooves, compressions, ruts, and the like) in the pavement are filled and compacted with select gradations of dry aggregate. These deviations can penetrate deep into the surface of a rough pavement, typically to a depth of up to 3 or 4 inches. The aggregate serves to infill lost volume to the structure and return the pavement surface to a uniform plane, with no divots, ruts, or other sizeable irregularities. The aggregate is also selected to exhibit the proper combination of micro and macro texture to ensure good traction for vehicles traveling over the road under ambient conditions. Typical aggregate size ranges from $1/4$ inches in diameter to $3/8$ inches in diameter; however, smaller or larger aggregate can be employed. Suitable aggregate includes coarse particulate material typically used in construction, such as sand, gravel, crushed stone, slag, recycled concrete or asphalt pavements, ground tire rubber, and geosynthetic aggregates. In paving applications, the aggregate serves as reinforcement to add strength to the overall composite material. Aggregates are also used as base material under roads. In other words, aggregates are used as a stable foundation or road/rail base with predictable, uniform properties (e.g. to help prevent differential settling under the road or building), or as a low-cost extender that binds with more expensive cement or asphalt to form concrete. The American Society for Testing and Materials publishes a listing of specifications for various construction aggregate products, which, by their individual design, are suitable for specific construction purposes. These products include specific types of coarse and fine aggregate designed for such uses as additives to asphalt and concrete mixes, as well as other construction uses. State transportation departments further refine aggregate material specifications in order to tailor aggregate use to the needs and available supply in their particular locations. Sources of aggregates can be grouped into three main categories: those derived from mining of mineral aggregate deposits, including sand, gravel, and stone; those derived from of waste slag from the manufacture of iron and steel; and those derived by recycling of concrete, which is itself chiefly manufactured from mineral aggregates. The largest-volume of recycled material used as construction aggregate is blast furnace and steel furnace slag. Blast furnace slag is either air-cooled (slow cooling in the open) or granulated (formed by quenching molten slag in water to form sand-sized glass-like particles). If the granulated blast furnace slag accesses free lime during hydration, it develops strong hydraulic cementitious properties and can partly substitute for Portland cement in concrete. Steel furnace slag is also air-cooled. Glass aggregate, a mix of colors crushed to a small size, is substituted for many construction and utility projects in place of pea gravel or crushed rock. Aggregates themselves can be recycled as aggregates. Many polymer-based geosynthetic aggregates are also made from recycled materials. Any solid material exhibiting properties similar to those of the above-described aggregates may be employed as aggregate in the SPARC process.

Once the dry aggregate is placed in the damaged areas (potholes, large divots, large cracks, or compressions), it is preferably compacted, smoothed and leveled off.

It is generally preferred to remove road reflectors and thermoplastic imprinting and safety devices (crosswalk markings, etc.) by mechanically removing, e.g., scraping off, prior to placing the aggregate. However, an advantage of the SPARC-HALO system over conventional processes is that there is no need to clean the pavement beyond broom clean, e.g., by removing dirt, nor is there a need to remove paint.

Reactive Emulsion Stage

In the second stage of the SPARC-HALO process, a reactive asphalt emulsion which is hot is sprayed, poured, or otherwise applied onto the dry aggregate-filled surface. The reactive asphalt emulsion thus applied quickly penetrates into small cracks and crevices in the old pavement as well as dry aggregate-filled areas, providing a substantially fully saturated cross section to a surface of the plane of the road. Because of the high penetrating ability of the reactive asphalt emulsion, only a small amount of binder is needed to form a strong bond with the dry aggregate—typically approximately 10% binder to 90% dry aggregate. The reactive hot emulsion is typically applied in the form of a 20% solid emulsion in water. The water in the reactive asphalt emulsion either flashes off during subsequent activities, or is absorbed by the aggregate or otherwise remains in the paving system. The binder bonds not only the new aggregate together, but also new aggregate to old pavement, and old pavement together.

The SPARC-HALO method utilizes various combinations of elastomers and other components so as to achieve a road surface exhibiting an extremely good toughness, extremely good stretchability, good environmental resistance, and good adhesion. The compositions are waterborne, sprayable, and can be provided as a single package. A plurality of crosslinkable binder elements is employed. In addition to binding new aggregate and aged pavement, the reactive emulsion compositions may be configured for use as a primer/tack coat, a stress absorbing interlayer, or a texture restoring and waterproofing top coat.

The compositions exhibit viscosities suitable for processing using conventional paving techniques, and polymerize at a temperature compatible with conventional asphalt paving temperatures. Dissolving diluents and plasticizers are employed in conjunction with the elastomers such that the rubberized mixture of elastomer and asphalt is rendered into liquid form at room temperature, which yields tremendous advantages in terms of handleability and ease of installation in addition to long term performance of the resulting paving material. The SPARC elastomer compositions include butyl rubber, diene modified asphalt, and environmentally hardened bioresins (bioresins that have been taken through a reactor cycle to enhance long term stability, sun resistance, and long term hydrolytic resistance), and contains negligible to zero perfluorocarbons (PFCs), e.g., less than 1% PFCs as the volatile components.

Alternatively to and in conjunction with the placement of dry aggregate in voids as previously described, the SPARC elastomer compositions can be prepared as an ambient liquid that, at the job site, may be sprayed into a mixer with aggregate. The composition coats the stone using similar techniques as in a hot mix plant, except that it is done at ambient temperature. The coated aggregate is laid on the ground and spread with conventional drag boxes or paving machines at a very thin coating. Depending upon the size of the aggregate, a thickness of $1/10$ inch can be obtained (e.g., using spray coating or other deposition techniques); however, thicknesses of approximately ½ inch are typically employed with using aggregate having a diameter of approximately ⅜ inches. In certain embodiments, a polypropylene mat as described elsewhere herein can be applied over the aggregate; however, in many embodiments acceptable or excellent results can be obtained without using such a mat.

The reactive emulsion is a waterborne emulsion of a polymer modified asphalt. The asphalt itself can be provided in emulsion form. Asphalt, also referred to as bitumen, is a sticky, black and highly viscous liquid or semi-solid that is present in most crude petroleums and in some natural deposits. Asphalt is used as a glue or binder mixed with aggregate particles to create asphalt pavement. The terms "asphalt" and "bitumen" are often used interchangeably to mean both natural and manufactured forms of the substance. Asphalt is the refined residue from the distillation process of selected crude oils and boils at 525° F. Naturally occurring asphalt is sometimes referred to as "crude bitumen." Asphalt is composed primarily of a mixture of highly condensed polycyclic aromatic hydrocarbons; it is most commonly modeled as a colloid. Most natural asphalts contain sulfur and several heavy metals such as nickel, vanadium, lead, chromium, mercury, arsenic, selenium, and other toxic elements.

A number of technologies allow asphalt to be mixed at temperatures much lower than its boiling point. These involve mixing the asphalt with petroleum solvents to form "cutbacks" with reduced melting point or mixtures with water to turn the asphalt into an emulsion. Asphalt emulsions contain up to 70% asphalt and typically less than 1.5% chemical additives. There are two main types of emulsions with different affinity for aggregates, cationic and anionic.

Asphalt can also be made from non-petroleum based renewable resources such as sugar, molasses, rice, corn, and potato starches, or from waste material by fractional distillation of used motor oils.

The asphalt can be modified by the addition of polymers, e.g., natural rubber or synthetic thermoplastic rubbers. Styrene butadiene styrene and styrene ethylenebutadiene styrene are thermoplastic rubbers. Ethylene Vinyl Acetate (EVA) is a thermoplastic polymer. The most common grade of EVA for asphalt modification in pavement is the classification 150/19 (a melt flow index of 150 and a vinyl acetate content of 19%). The polymer softens at high temp, and then solidifies upon cooling. Typically, approximately 5% by weight of the polymeric additive is added to the asphalt. Rubberized asphalt is particularly suited for use in certain embodiments.

Functionalized triglyceride bioresins can be employed as the thermoset component. Thermosets harden at high temperature. When employed in combination with a thermoplastic component, the composition maintains its shape better on heating and under high temperature conditions. Suitable bioresins are derived from triglycerides—fatty acid triesters of the trihydroxy alcohol glycerol, Triglycerides are an abundant renewable resource primarily derived from natural plant or animal oils that contain esterified mono- to poly-unsaturated fatty acid side chains. They can be obtained from a variety of plant sources, e.g., linseed oil, castor oil, soybean oil. Linseed oil comprises an average of 53% linolenic acid, 18% oleic acid, 15% linoleic acid, 6% palmitic acid, and 6% stearic acid. Cross-linking can occurs at points of unsaturation on the fatty acid side chains. The triglycerides can be modified to contain epoxy and/or hydroxy groups by methods known in the art to improve cross-linking and to allow the triglyceride to be cross-linked using conventional urethane crosslinking chemistries.

Suitable binder crosslink components include resins that are multifunctional and react with active hydrogens, e.g., in carboxylic or carbonyl, or hydroxyl. These resins can include bisphenol A-based liquid epoxy resins and aliphatic glycol epoxy resins as marketed by The Dow Chemical Company, polyurethanes, and isocyanates. The binder crosslink component is water dispersible but will stay buffered from going into a crosslink in the presence of water. Upon evaporation of the water, it will self-cross within 24 hours just from UV initiation. As long as water is present in the mix, the components can remain in proximity without cross-linking (e.g., yielding a single component formulation).

Suitable suspension components include pre-crosslinked bioresin suspension gels. They react with both the crosslink component and catalyst to yield a tough, water resistant, shear resistant plastic. The suspension component is preferably relatively inexpensive, has tremendous robustness, and is not hydrophobic.

Suitable catalysts include multi-functional pre-dispersed initiators (MFXI). Multifunctional initiators are those that possess more than one functional group capable of providing a site for chain growth. The catalyst assists in improving growth of molecular weight, and when compounded into the polymer imparts robustness. The catalyst can be activated by either ultraviolet radiation (e.g., sunlight) or heat. Suitable multifunctional catalysts can include one or more sulfates and a reactive metal that is an electron scavenger, which can cause crosslinking between a hydrogen-seeking crosslinking agent and other functional groups in the presence of water.

The components of the reactive emulsion composition can undergo a thermotropic conversion, resulting in entanglement and/or bridging at functional groups such that the resulting reaction product comprises both thermoplastic and thermoset elements. The resulting composition exhibits a superior suspension (the "yield") against the settling of the much denser inorganic element (fine to coarse aggregate) by the formation of a "clathrate" or "cage-like" medium. This fully integrated, interlocking connectivity between the three polymeric components maintains the aggregate in place and better protected from the elements than in conventional formulations.

The thermoplastic component and the thermoset/suspending components possess chain-terminating functional groups that are hindered mostly by water but will selectively react to form a crosslink, upon water evaporation, to the thermoplastic functionality rather than to the functionality of sister thermoset molecules, thereby forming a true thermotrope rather than a less precise molecularly entanglement which exhibits more amorphous (and less useful) physical properties. The composition can be provided as a single package, which is activated/cross-linked upon removal of the water. The chain chemistry is such that thermoplastic moieties are coupled to thermoset moieties. When heated, it will act like a thermoplastic but it will have substantial resistance to distortion because of the thermoset components. The relative amounts of thermoplastic and thermoset components will determine the resistance. For example, a small amount of thermoplastic moieties with a large amount of thermoset moieties will exhibit little plasticity upon heating. The resulting cross-linked material can be considered to be a thermotrope that will behave like both a thermoset and a thermoplastic at different temperatures.

The thermoplastic component in the water-borne compositions of selected embodiments is a preferably a polymer modified asphalt emulsion, with the polymer typically a styrene, ethylene, butadiene styrene, or a styrene butadiene styrene polymer. The midblock, e.g., butadiene and/or ethylene butadiene, can be linear or radial. Polyethylene glycols, such as those available from Kraton and Asahi, are water-soluble nonionic oxygen-containing high-molecular ethylene oxide polymers having two terminal hydroxyl groups. They are available in a broad range of molecular weight grades, and include crystalline thermoplastic polymers (MW>2000) suitable for use in certain compositions of the various embodiments. An additional broad range of properties is available by integrating polyisobutylene rubber (e.g., Oppanol® manufactured by BASF of Ludwigshafen am Rhein, Germany). The Oppanol® polyisobutylenes are of medium and high molecular weight, ranging from 10,000 MW up to 5000,000 MW. The following are properties of commercially available Oppanol® polyisobutylenes that are suitable for use in SPARC elastomer compositions of preferred embodiments.

| Oppanol ® | Viscosity in solution (isooctane, 20° C.) Concentration [g/cm3] | Staudinger Index (J0) [cm3/g] | Average molecular weight, viscosity average (Mv) [g/mol] | Stabilized [with BHT] |
|---|---|---|---|---|
| medium-molecular-weight Oppanol ® | | | | |
| B 10 SFN | 0.01 | 27.5-31.2 | 40 000 | No |
| B 10 N | 0.01 | 27.5-31.2 | 40 000 | Yes |
| B 11 SFN | 0.01 | 32.5-36.0 | 49 000 | No |
| B 12 SFN | 0.01 | 34.5-39.0 | 55 000 | No |
| B 12 N | 0.01 | 34.5-39.0 | 55 000 | Yes |
| B 13 SFN | 0.01 | 39.0-43.0 | 65 000 | No |
| B 14 SFN | 0.01 | 42.5-46.4 | 73 000 | No |
| B 14 N | 0.01 | 42.5-46.4 | 73 000 | Yes |
| B 15 SFN | 0.01 | 45.9-51.6 | 85 000 | No |
| B 15 N | 0.01 | 45.9-51.6 | 85 000 | Yes |
| high-molecular-weight Oppanol ® | | | | |
| B 30 SF | 0.005 | 76.5-93.5 | 200 000 | No |
| B 50 | 0.002 | 113-143 | 400 000 | Yes |
| B 50 SF | 0.002 | 113-143 | 400 000 | No |
| B 80 | 0.002 | 178-236 | 800 000 | Yes |
| B 100 | 0.002 | 241-294 | 1 110 000 | Yes |
| B 150 | 0.001 | 416-479 | 2 600 000 | Yes |
| B 200 | 0.001 | 551-661 | 4 000 000 | Yes |

The reactive emulsion can be sprayed or poured on a prepared or unprepared pavement surface to be repaired. Upon contact with hot rock, the water present evaporates and the composition sets. Once set, the composition may be compacted by a vibrating roller while at or above 150° F. The resulting surface has a very low void density, a high resistance to heating and softening, and it has anchor points with a wearing core essentially that is bound into it that will not move if new pavement is placed on top. The compositions of preferred embodiments enable the densification to be dramatically improved, e.g., 5% voids can be reduced to 2-2.5% voids. The life of the pavement is increased substantially upon improvement in densification.

Although dry, untreated aggregate can be employed in the preparatory stage, in certain embodiments it can be desirable to pretreat the aggregate surface to form "anchor points" by coating with a water dispersible thermoset resin that has, in addition to the functional groups which selectively couple with the thermoplastic functionality discussed above, an independent, mid-morphology, pendulous functionality which bonds with a sufficiently improved strength to the specific rock chemistry being used in the final composition. This helps assure that the film stays in place and does not prematurely slip laterally. A benefit in an application such as an interlayer primer is much higher compaction and thus a lower void density, i.e., improved resistance to oxidative, hydrocarbon embrittlement and ultimately a noticeably longer useful.

The reactive emulsions exhibit superior properties when compared to conventional formulations. The superior properties can be in the areas of handling, storability, hazmat, curing characteristics, environmental considerations, chemical resistance, water resistance, sun resistance, tensile and flexural quanta, and anti-strip quanta. The compositions can be handled, stored and installed using conventional equipment. They can exhibit reduced hot mix asphalt (HMA) concrete void density. They can provide a novel way to restore microtexture to a pavement surface. They can exhibit improved water resistance and/or sun resistance. The compositions can provide the highest mechanical properties versus unit of cost, and are sustainable. The compositions reform and stabilize a broad range of weakness in asphalt and result in a substantially lower life cycle cost of pavement maintenance.

Elastomer Coated Aggregate Stage

In certain embodiments, after the aggregate has been placed and the reactive emulsion has been applied, optionally a thin layer (from about ⅛ inches or less to about 1 inches or more) of elastomer coated aggregate is either sprayed or spread across the surface of the pavement so as to provide a uniform surface and to fill in any other depressions that were not aggregate filled during the dry aggregate preparation stage.

Heating Stage

After the dry aggregate preparation and reactive emulsion steps, the pavement can be considered a "wet" system that, if left to slow cure, would eventually provide some degree of quality as to the driving surface. However, the heating step subsequently employed in the SPARC-HALO system results in a dramatically superior driving surface. The heating element applies microwave-infrared radiation that penetrates deep into the pavement, softening it and crosslinking the upper portions of new material, yielding a material that after compression into a dense structure will exhibit properties well exceeding those of conventional asphalt pavement in terms of toughness, resilience, flexibility, and/or resistance to cracks. In the lower, old pavement portions beneath the new portions the heating and rolling process compresses and pushes together the warmed old asphalt and the preparation of the nearly volatile-free: emulsion or the SPARC emulsion, eliminating voids, to create a tougher and more durable transition region between the old pavement substrate and the new overlay. The transition region is a continuum, and at depths of from 2½ to 3 inches or more, past which the preparation or SPARC emulsions and/or the electromagnetic energy do not penetrate. The material is essentially old asphalt paving that has been remelted and pushed together. Because it does not contain SPARC elastomer, the properties will be similar to those of conventional asphalt; however, cracks and fissures will have been eliminated by the process and thus will not telegraph to the surface.

Accordingly, after application of the reactive emulsion (and optionally the thin layer of elastomer coated aggregate aggregate) over the aggregate filled pavement surface, a heat shuttle including a heating element is passed over the pavement surface. The heat shuttle can be of any suitable dimension, e.g., as large as or larger than 32 feet wide by 32 feet long, or smaller, e.g., 8 feet wide by 8 feet long, or 4 feet wide by 4 feet long. In a particular preferred embodiment, the shuttle is sufficiently wide so as to cover an entire width of a standard road or highway traffic lane including associated shoulder, or a full width of a typical two lane road. The heat shuttle is pulled across the top of the prepared surface. As the heat shuttle passes over the surface, a heating element delivers electromagnetic radiation having a frequency in the terahertz to the mid-infrared range that penetrates through the layer of elastomer coated aggregate, and down into the aggregate-filled new portions as well as the undisturbed old portions of the pavement being repaired. The electromagnetic radiation having a frequency in the microwave-infrared range penetrates down to a depth of 3 or more inches, heating the entire penetrated mass of repaired pavement to a temperature of at least about 200° F., but preferably not more than 275-300° F., yielding a softened heated mass comprising the topmost 3 inches of the pavement surface. An advantage of the SPARC-HALO system is that the old pavement is not disrupted as part of the repair process, such that there is minimal oxidation of the old pavement upon application of heat, such that minimal smoke is generated by the process.

The heat shuttle can incorporate various different types of heating elements (also referred to as emitters, HALO emitters, or the like). One conventional type of emitter comprises a stainless steel tube wherein natural gas or liquid propane gas are mixed with air and ignited, generating heat (infrared energy) that is released through the stainless steel tube. Although other types of alloys can also be employed for the tube, stainless steel is generally preferred for its slow deterioration and for the bandwidth of energy that radiates from the outside of that tube typically in the medium to far infrared which exhibits good penetration into asphalt pavement systems. Other types of emitters include those incorporating a rigid ceramic element where the combustion takes place in micropores in the ceramic element. Bandwidth for such emitters is also in the medium to far infrared. Another type of emitter incorporates a flexible cloth-like ceramic medium having several layers, or layers of stainless steel cloth together with ceramic cloth. The cloth traps the combustion gases so that no flame is present on the surface of the element while generating infrared emissions. Any suitable device capable of generating infrared radiation that penetrates to a depth of 2, 3, 4 or more inches into the pavement surface can be employed.

A particularly preferred heat shuttle incorporates a proprietary ceramic structure in a form of thin sheets of cloth-like material that can operate at much higher temperatures (e.g., 2000° C.) than conventional ceramics (e.g., 1500° C.). In this structure, a higher combustion temperature can be obtained by catalyzing combustion of an air/liquefied petroleum gas (LPG) mixture or air/nitric gas mixture. The infrared electromagnetic radiation generated is typically of shorter wavelength than the previously described systems, and can more quickly and efficiently heat the pavement than these conventional systems. The system also avoids creation of an open flame, with the resulting generation of smoke and other carbon emissions from the heated pavement. Any combustible mixture that slows down the combustion reaction such that longer wavelengths (as are characteristic for electromagnetic radiation having frequency in the terahertz range) are produced can be employed to generate penetrating electromagnetic radiation. One example is methanol in LPG. Conventional combustion systems typically generate electromagnetic radiation with a wavelength of from 1-5 nm. Instead, it is generally preferred that electromagnetic radiation of longer wavelengths, e.g., of from 2-5 mm (characteristic for electromagnetic radiation having a frequency in the terahertz range) be generated.

In certain embodiments, simplified electronics and software can be employed in connection with a HALO device that employs a simple emitter, so as to avoid high capital expenditures. The emitter is designed to produce radiation at a wavelength or range of wavelengths that will penetrate the pavement while at the same time minimizing excess heating in an upper region of the pavement, such that substantially uniform heating throughout the asphalt medium down to a depth of at least 2 inches is obtained. In some embodiments, substantially uniform heating includes a temperature differential throughout a preselected depth, e.g., 2 inches, of no more than 50° F. In other words, the temperature of any portion of the upper region is no more than 50° F. higher than any portion of the lowest region. However, in certain embodiments, larger temperature differentials may be acceptable, e.g., up to 100° F. or more, provided that damage to the cured surface is avoided.

To attain the desired temperature profile, radiation in the infrared region is applied. The radiated energy applied to the surface is selected so as to control a depth of penetration and a rate of penetration to avoid heating or activating the asphalt too quickly, which may damage the pavement. The HALO devices of preferred embodiments can be manufactured to minimize cost and are suitable for use in the field. Field use can be achieved by powering the HALO device using a portable generator, e.g., a Tier 4 diesel engine, which qualifies under current emission standards. In one embodiment, the generator is electrically connected to a series of emitter panels situated within a metal frame. The device can be insulated with a high-density ceramic, and the panels can be nested within the ceramic liner of a frame points to point downward towards the pavement. One example of a HALO emitter panel is provided in FIG. 2.

An array of panels can be assembled together, as in an array of 2×1 panels, or any other desired configuration, e.g., 2×2, 2×3, 2×4, 2×5, 2×6, 2×7, 2×8, 2×9, 2×10, 2×11, 2×12, 2×13, 2×14, 2×15, 2×16, 2×17, 2×18, 2×19, 2×20, 2×(more than 20), 3×3, 3×4, 3×5, 3×6, 3×7, 3×8, 3×9, 3×10, 3×11, 3×12, 3×13, 3×14, 3×15, 3×16, 3×17, 3×18, 3×19, 3×20, 3×(more than 20), 4×4, 4×5, 4×6, 4×7, 4×8, 4×9, 4×10, 4×11, 4×12, 4×13, 4×14, 4×15, 4×16, 4×17, 4×18, 4×19, 4×20, 4×(more than 20), 5×5, 5×6, 5×7, 5×8, 5×9, 5×10, 5×11, 5×12, 5×13, 5×14, 5×15, 5×16, 5×17, 5×18, 5×19, 5×20, 5×(more than 20), 6×6, 6×7, 6×8, 6×9, 6×10, 6×11, 6×12, 6×13, 6×14, 6×15, 6×16, 6×17, 6×18, 6×19, 6×20, 6×(more than 20), 7×7, 7×8, 7×9, 7×10, 7×11, 7×12, 7×13, 7×14, 7×15, 7×16, 7×17, 7×18, 7×19, 7×20, 7×(more than 20), 8×8, 8×9, 8×10, 8×11, 8×12, 8×13, 8×14, 8×15, 8×16, 8×17, 8×18, 8×19, 8×20, 8×(more than 20), 9×9, 9×10, 9×11, 9×12, 9×13, 9×14, 9×15, 9×16, 9×17, 9×18, 9×19, 9×20, 9×(more than 20), 10×10, 10×11, 10×12, 10×13, 10×14, 10×15, 10×16, 10×17, 10×18, 10×19, 10×20, 10×(more than 20), 11×11, 11×12, 11×13, 11×14, 11×15, 11×16, 11×17, 11×18, 11×19, 11×20, 11×(more than 20), 12×12, 12×13, 12×14, 12×15, 12×16, 12×17, 12×18, 12×19, 12×20, 12×(more than 20), 13×13, 13×14, 13×15, 13×16, 13×17, 13×18, 13×19, 13×20, 13×(more than 20), 14×14, 14×15, 14×16, 14×17, 14×18, 14×19, 14×20, 14×(more than 20), 15×15, 15×16, 15×17, 15×18, 15×19, 15×20, 15×(more than 20), 16×16, 16×17, 16×18, 16×19, 16×20, 16×(more than 20), 17×17, 17×18, 17×19, 17×20, 17×(more than 20), 18×18, 18×19, 18×20, 18×(more than 20), 19×19, 19×20, 19×(more than 20), 20×20, 20×(more than 20), or (more than 20)×(more than 20). The panels can be of any suitable size, e.g., 1×1 inches or smaller, 3×3 inches, 6×6 inches, 12×12 inches, 18×18 inches, or 24×24 inches or larger. The panels can be one or more of square, rectangular, triangular, hexagonal, or other shape. Preferably, the panels abut each other so as to minimize non-emitting space; however, in certain embodiments some degree of spacing between panels may be acceptable, such that, e.g., circular emitters can be employed, or, e.g., square emitters can be spaced apart. One example of a suitable array is a 2×12 array of one foot square panels.

While in certain embodiments a coiled or straight wire can be employed in the emitter, in a particularly preferred embodiment the panels include a serpentine wire as an emitter. An advantage of the serpentine configuration is that it does not have the high resistance exhibited by spaced apart coils. Accordingly, more of the energy is emitted as radiation of the desired wavelength. The coils are spaced apart to minimize the resistance, and a radiant energy is emitted within a "sandwiched" space bounded on the upper side of by the high-density ceramic that has a very low permittivity and essentially redirects the reflected energy from the serpentine wire downward.

On the lower side of the wires, which can advantageously be embedded in a support or be self-supporting, is a thin micaceous panel. The mica group of sheet silicate (phyllosilicate) minerals includes several closely related materials having close to perfect basal cleavage. All are monoclinic, with a tendency towards pseudohexagonal crystals, and are similar in chemical composition. The nearly perfect cleavage, which is the most prominent characteristic of mica, is explained by the hexagonal sheet-like arrangement of its atoms. Mica or other materials exhibiting micaceous properties can include a large number of layers that create birefringence or trirefringence (biaxial birefringence). Birefringence is the optical property of a material having a refractive index that depends on the polarization and propagation direction of light. These optically anisotropic materials are said to be birefringent. The birefringence is often quantified by the maximum difference in refractive index within the material. Birefringence is also often used as a synonym for double refraction, the decomposition of a ray of light into two rays when it passes through a birefringent material. Crystals with anisotropic crystal structures are often birefringent, as well as plastics under mechanical stress. Biaxial birefringence describes an anisotropic material that has more than one axis of anisotropy. For such a material, the refractive index tensor n, will in general have three distinct eigenvalues that can be labeled $n_\alpha$, $n_\beta$ and $n_\gamma$. Both radiant and conductive energy from the serpentine wire is transmitted to the micaceous element. The birefringent characteristics of the micaceous material can be employed to transmit a subset of wavelengths generated by the serpentine wire while filtering out other wavelengths. The emitter of certain embodiment employs a sheath of stainless steel that protects the micaceous material from being damaged. This conductive sheath transfers energy with no significant wavelength translation. By employing this combination of components (e.g., serpentine wire, micaceous material, stainless steel sheath), energy generated by the serpentine wire with a peak wavelength of about 2 micrometers can be taken down to about 20 micrometers. A wavelength of from about 20 to about 100 micrometers is generally preferred for use in connection with asphalt applications. The thickness or other characteristics of the micaceous material can be adjusted to provide a targeted wavelength or range of wavelengths to the surface.

In a particularly preferred embodiment, the HALO device has a 2-foot wide by 12-foot long intercavity dimension, configured similar to a hood, in which a ceramic insulation is mounted. The emitter elements are advantageously 1 foot by 1 foot. E.g., a 2-foot wide HALO device can be configured to be 2 elements wide by 12 elements long, for a total of 24 elements. Such elements can have a Watt density of roughly 14 Watts per square inch, at full energy, capable of being powered by, e.g., a generator that can deliver 250 kW. An example of a portable HALO device suitable for use in repairing asphalt pavement is depicted in FIG. 3.

A net frame is preferably attached to reels on the outside of the device, to permit adjustment of the emitter within the cavity itself, or to permit adjustment of the height of the emitter over the pavement. In a preferred embodiment, the emitter is provided in a cavity approximately 6 inches deep, and a height of the emitter surface over the pavement surface can be varied from as low as a quarter of an inch or as high as an inch or more. The emitter is preferably placed as close to the surface of the pavement as is practical (e.g., <1 inch, or <0.5 inches, or <0.25 inches) so as to minimize loss of energy via reflectance and/or refraction by the pavement surface. However, if the spacing is too close, imperfections in the pavement surface, or smoke or dislodged gummy residue, may cause damage to the emitter.

In preferred embodiments for pavement repair applications, an emitter design can be employed wherein multiple units (e.g., 1, 2, 3, 4, 5, 6, 7, 8, 9, or 10 or more) are grouped together. For example, four units, each including a 3×3 emitter array, will provide 36 square feet of emitter. Four units, each including a 4×6 emitter array, will provide 96 square feet of emitter. It is generally preferred to employ a square footage of emitter that can be supported by a desired generator. 250 kW generators are generally preferred, as providing a good balance of power and cost, but in certain embodiments larger generators can be employed, e.g., a 300 kW generator. Instead of a larger generator, two or more smaller generators can be employed to provide adequate power for a preferred array size. In a preferred embodiment, a 250 kw generator can be employed to power a 100 square foot emitter array that puts out 14 watts per square inch. Two such generators can be provided on the same tug to power 250 square feet of emitter. In most paving applications, the width of the road to be repaired is approximately 12 feet, so emitter arrays or groups of emitter arrays having a width of 12 feet and a sufficient length to provide an appropriate amount of energy to the surface are desirable.

In operation, circuits and sensors can be employed to identify obstacles underneath the emitter unit, e.g., by sensing reflected energy or heat buildup, and can adjust the power to the emitter or the distance of the emitter from the pavement surface. Other sensors can detect the presence of combusted organics, e.g., a laser that can detect a certain amount of smoke passing through its beam. If high temperature is detected, the emitter can be distanced from the pavement, power can be reduced, or the speed at which the emitter passes over the surface can be decreased. Similarly, if the temperature detected is too low, the power of the emitter can be increased, it can be distanced from the surface, or the speed at which the emitter passes over the surface can be increased.

In certain embodiment, the heat shuttle passes over the pavement, flashing off non-VOC components and bringing moisture in the pavement to the surface, warming the mass of pavement. The pavement is then allowed to cool down to a preferred temperature for compression, at which time a vibrating roller is passed over the surface. An advantage of the system is that virtually no smoke is produced while operating the system. The resulting pavement has a density similar to new pavement, but incorporates durable elastomers imparting superior performance properties.

Another advantage of the SPARC-HALO system is that the SPARC elastomer composition can be formulated to include a resealing adhesive that does not lose its internal cohesion (stickiness) over time. A road repaired using the SPARC-HALO system that begins to show signs of wear (microfissures or cracks) can be readily repaired simply by passing the heat shuttle across the surface (for, e.g., 30 seconds to 2 or 3 minutes), then passing a compaction roller over surface, which repairs and reseals the cracks. Should a crack appear in the pavement that is beginning to show signs of wear, you simply pass the heat shuttle across the surface. A quick pass of the HALO device of 30 seconds, followed by a roller pass, can result in a robust crack repair. Preferably, such a heating/rolling treatment is employed approximately every three to five years so as to maintain the pavement in good condition for 20 years or more.

Upon exposure to a temperature of approximately 250° C., the elastomer of the reactive emulsion crosslinks, generating a bond (between new aggregate, between new aggregate and old pavement, or between portions of old pavement) of sufficient strength such that a conventional road vibratory roller can be applied over the top of the pavement surface to provide a new driving surface. During rolling, the vibratory compaction redensifies all the defects in the old road bed.

In some embodiments, additional elastomer can be applied prior to vibratory compaction. The elastomer is preferably applied as a spray that penetrates into the old road surface, filling cracks and crevices such that when vibratory rolling takes place it further bonds the old pavement together as well as regions between the new material and the old material.

Rubber, a material commonly employed in asphalt pavements, is a high energy-absorbing material right on its surface. If it absorbs too much energy too quickly, it will become a source of combustion and can damage the emitter unit or emit fumes into the atmosphere. Accordingly, in some embodiments it is desirable to include a feedback loop on each emitter panel (e.g., a 1 foot square panel) in an array, so as to continuously monitor the power density at the emitter's particular setting and its effect on the pavement. The power density can be, for example, 3 to 15 W/in$^2$, corresponding to 0.47 to 2.33 W/cm$^2$ or from 133 to 664 (ft·lb/min)/in$^2$. Each emitter panel can be independently operated so as to provide an appropriate amount of energy to the surface beneath. Because rubberized coating is commonly employed as crack sealer on old roads, it can be desirable to have such control over each emitter panel.

To provide satisfactory pavement repair, the presence of irregularities and defects on the surface, such as cracks, fissures, low areas, and the like, must be addressed. It is typically preferred to sweep off any thick cross-sections of dirt, to remove vegetation and to remove any reflectors that are on the road. The presence of road paint, e.g., paint used for lane markers, generally does not present any issues as to operation of the emitter, provided it is thin and does not contain substances that may prevent uniform heating. The paint employed in crosswalks may contain substances that prevent uniform heating. In such situations, the crosswalk markings can be removed, the emitter can be operated so as not to move over the markings, or the emitter is shut off when it goes over crosswalk markings (e.g., manually shut off, or automatically shut off when markings are detected). Crosswalks that comprise a thick thermal plastic strip placed on the pavement can inhibit management of the delivery of energy into the deep pavement, and are desirably removed and reinstalled prior to pavement renovation, or such areas are avoided during renovation.

Irregularities and defects on the surface of the pavement can vary. In some instances, the surface has a boney, or rough look and texture, where large rocks have essentially become islands rising above the lower sections of the pavement due to fine rock being dislodged. In some instances, fissures or potholes that are in each up to two inches or more deep may be present. Severe irregularities and defects can be advantageously repaired using a combination of stone and a formulated SPARC elastomer that glues the stone together once it's cured. The SPARC elastomer is applied to the surface and then cured using the HALO device. In certain embodiments, the coating can be as thin as one gallon or less per hundred square feet of stone and elastomer spread over the surface, e.g., a coating as thin as a few thousandths of an inch. In certain embodiments, a mixture of SPARC elastomer and aggregate can be blended to form a cold slurry that is spread over the surface to replace volume on a damaged or deteriorated road and then cured using the HALO device. In such embodiments, an initial application of heat prior to the emitter can be applied, e.g., open flame or other heating unit as described elsewhere herein, that causes an initial flashing of volatile materials from the cold slurry. This initiates some degree of curing, to prevent adhesion of the slurry to the tires of the tow rig pulling the emitter. Alternatively, the tires, the driving unit and the HALO device, are configured so as to straddle the strip of pavement that is being repaired.

In the case of large and very long runs on highways, use of the SPARC-HALO system can minimize closure time, even under conditions wherein material is placed and compacted, due to the rapid curing observed. In such embodiments, an uncured surface of various stone sizes and elastomer recipes can be spread across the surface and then the HALO device is pulled over it, simultaneously drying out and heating the adhesive on the surface while also, at a different wavelength, pushing energy deep into the pavement so that, based upon the prescription for the repair, simultaneous curing of the material on the top is achieved, along with and warming and disturbing to a homogenized state the interstitial asphalt of the pavement up below to a depth of 3 inches or more.

Following behind the HALO unit, a compactor can be employed once the pavement cools. Typical temperatures after HALO treatment are about 250° C. Once heat dissipates such that the temperature is 180-190° C., a compacting roller can be applied. A single or 2-drum roller with vibrating capabilities can be run across the surface to compact the voids that are in the old pavement, basically reducing it to a density that is similar to that of virgin pavement, and further compacting the new material down into voids and irregular surfaces of the pavement where the SPARC repair material had been placed. Multiple passes of a roller can be applied, e.g., two, three, four, or more passes. Three or four passes will provide the density and the uniform fusion between the particles that results in a long-lasting pavement cross-section.

The SPARC elastomer typically comprises four components, and is a very robust emulsion that can contain asphalts of various hardnesses. The elastomer can also include butyl rubber, a styrene-butadiene-styrene (SBS) polymer, and a bioresin. The type of bioresins, the concentration of the SBS polymer, and the molecular weight of the butyl rubber employed, along with other components of the mixture, can be balanced to achieve a desired set of properties of the adhesive system in its cured form. The SPARC elastomer as desirably employed as a mask to protect the underlying pavement as it goes through this heating cycle from oxidation at the surface, because the temperature is higher at the surface than it is deep down when the HALO system is applied to the pavement. In order to have a sufficient amount of energy penetrating to depth so as to fluidize the asphalt, and to minimize hot spots, the SPARC elastomer can act as a mask to avoid oxidation of the asphalt where hot spots are present.

Depending upon the nature of the materials present in the SPARC elastomer, a wavelength separating effect can occur in the elastomer as in the micaceous material, such that certain wavelengths are preferentially transmitted. The elastomer does not have to be a pure organic material; it can have materials like silicon dioxide or other materials that have a desired permittivity to a particular wavelength, or birefringent or trirefringent properties. In some embodiments, these components are present in a volume as high as 50% in the SPARC elastomer composition; however, in certain embodiments lower amounts can be desirably employed, e.g., from 1-10% by volume, or from 10-50% by volume.

The relative permittivity of a material under given conditions reflects the extent to which it concentrates electrostatic lines of flux. In technical terms, relative permittivity is the ratio of the amount of electrical energy stored in a material by an applied voltage relative to that stored in a vacuum. For example, the power source can be the emitter, the transmitting device can be the medium through which the emitter's energy is passing, and the load is what actually happens when the molecular structure of the various substances adsorbs the energy. The movement of energy from the HALO device through the pavement medium can be described in terms of the relative permittivity of the pavement. For methodologies for creating a wavelength of energy, typically resistance wires are used for heating, e.g., wires comprising iron, aluminum, titanium, platinum, etc., and a variety of other materials that create design resistance. The resistance of the flow of electric current creates infrared energy that falls in the bandwidth from a millimeter long down a few micrometers—the infrared (IR) microwave boundary. Materials are heated depending upon the absorbent qualities of polar materials, like water, that they contain. There are certain bandwidths in the IR region that are highly condensed or captured within the structure of, e.g., water, and quick energy absorption is observed (e.g., a quick rise in terms of temperature as a result of that absorbed energy). The IR microwave boundary can be considered that region between far infrared and what can be considered extremely short microwaves (e.g., 1 millimeter). In preferred embodiments, it is desirable for the emitter to a substantial amount of energy in this region, e.g., 1, 5, 10, 15, or 20 nm up to 1, 2 or more millimeters, preferably from about 2 microns to 1 millimeter. Many materials are substantially transparent to microwaves having a bandwidth that is down in the megahertz and kilohertz range, which are very long bandwidths compared to IR heating. These microwaves penetrate materials readily that do not have a high hydroelectric constant or a high relative permittivity. The microwave transmissivity of common materials such as are used in the paving industry or other industries are well known or readily ascertained by one of skill in the art. The refraction and reflection that takes place between the emitter surface and the surface of the SPARC emulsion when it is placed on the top of the pavement can likewise be ascertained, so as to achieve a desired temperature profile in the pavement.

In an asphalt pavement surface contacted with energy having a 20 micrometer wavelength against the surface, the presence or absence of the SPARC emulsion on the surface can have a profound affect in terms of how much energy is refracted, reflected and, transmitted below the surface to the interstices of the asphalt at, e.g., three inches in depth. Refraction is the change in direction of a wave due to a change in its medium. It is essentially a surface phenomenon. Refraction is mainly in governance of the law of conservation of energy. Momentum due to the change of medium results in the phase of the wave being changed, but its frequency remains constant. As energy moves from the emitter to the surface of the pavement, the rate of movement remains the same, and the wavelength remains the same; however, the incident wave is partially refracted and partially reflected when it hits the surface. Snell's Law, also referred to as the Law of Refraction, is a formula that is used to describe the relationship between the angles of incidence and refraction. Refraction that takes place at interface, e.g., a boundary between air and a solid, can exhibit a phenomenon referred to as an evanescent wave, wherein the wavelengths on one side of the boundary are partially reflected and partially refracted. At the boundary, reflected energy or wavelengths can come back from the substance, creating a chaotic collision of electromagnetic energy that is generally one-third of the wavelength. For either a narrow energy source such as a laser or a broad infrared radiant energy source coming to the surface of a solid, one is able to measure this perturbance and predict with a degree of accuracy how much energy is returned and how much is transmitted, which impacts the amount of energy transmitted into the pavement. An advantage of the SPARC emulsion on the pavement surface is that it disrupts the organized formation of a wave bouncing back out of the pavement, such that more energy can be transmitted into the pavement. Knowing the wavelength that is presented to the pavement, the evanescence wave that is created, and the permittivity of the material enables one to predict and control the heating characteristics of the pavement. The relative permittivity is an absolute number for stone, for water, for the atmosphere of the voids in the pavement, for the asphalt that is in the interstices. When considered together, one can analyze what the effect of a particular wavelength on its rate of movement through the pavement, e.g., through the use of conventional probes for determining energy levels and bandwidth changes. This permits the emitter and the materials employed in the SPARC emulsion to be selected such that wavelength can be manipulated to about a millimeter, which is in the terawatt range. In this range, the depth of penetration for the amount of energy that is used from the generator is profoundly improved, such that energy consumption is reduced.

For an emitter temperature that is at 750° F., and for an immediate surface temperature, e.g., ⅓ of the wavelength below the SPARC emulsion layer that is 55° F., within a few seconds, because it is time-dependent, a temperature at just below the surface, e.g., a millimeter below the surface, is 75° F. Moving down progressively in increments of ½ inch to one inch, the emitter temperature versus the surface temperature versus the temperature at various depths can be analyzed. This power depth loss of the energy as it enters the pavement from the irradiated surface can be compensated for by manipulating the surface energy, the Watt density, the wavelength, the effects of evanescence wavepaths, and the wavelength of energy passing through the pavement so as to increase the uniformity of heating from the surface to a desired depth (e.g., 3 inches). As top temperature threshold, it is desirable to avoid the formation of organic gases, which indicates that the material has gone past the threshold of maintaining its original molecular structure. If gas formation is not apparent, as indicated by the absence of smoke, the power can be increased; however, that is not the only factor that should be considered. The other factor is a desire to minimize the amount of power that it takes to get the energy as deep as it needs to be (e.g., as can be determined by characterizing how deep the voids are that are part of the flaws in the pavement so that it can be determined how long the unit has to stay over a certain spot with a particular configuration to reach that depth). One must also achieve a temperature such that when a roller is applied to the heated pavement, it is fluidized and will compress to eliminate voids, whereby homogenization of the rejuvenated pavement is achieved.

In terms of relative permittivity, that of water, for instance, is 80 times higher than that of rock, which is 7. Asphalt's relative permittivity is similar to that of water—60-70 times higher than that of rock. Rock is can be considered substantially microwave transparent. This means 95% of the pavement cross-section is essentially transparent to millimeter wavelengths. Referring back to Snell's Law, the more oblique the angle of the radiation coming to the surface from its boundary zone (critical angle incidence), the higher the refraction and the higher the reflection. The angle of incidence of the radiation can therefore be manipulated to adjust the amount of energy transmitted. Okay. I had incoming calls, sometimes that botches my transmission. The microwave wavelength is going to interface a solid surface at a much more direct angle, such that for a microwave transparent material like stone, some IR energy that is quickly absorbed by the aggregate in the interstices can be desirable for heating.

In preferred embodiments, it is desired to move energy from the emitter surface to 3 inches deep in the pavement, in the shortest amount of time without destroying or otherwise significantly damaging the materials in the upper region. The SPARC-HALO system can enable this to be achieved. In contrast, heating with gas-fired, open-flamed propane that generates primarily IR radiation results in excess surface heating—smoke coming off the pavement, indicated destruction of organic pavement constituents such as rubber or asphalt. The components' molecular weights can be negatively impacted, causing the damaged portions to lose water resistance, adhesiveness, and other desirable properties. The SPARC-HALO system also results in reduced fuel costs, compared to conventional combustion systems, which are impractical to tune for wavelength by adjusting, e.g., air/fuel mixtures, and are extremely inefficient in terms of power consumption per unit of energy transmitted to the pavement.

The composite structure of the pavement is 95% aggregate that exhibits microwave transparency, whereas 75-78% of the remaining 5% is in the form of polar molecules that are affected dramatically by contact with microwave radiation. In use, the emitter is turned on and drawn across the pavement. The entire continuum of the wavelengths and how energy is moving through the pavement is in a state of flux, meaning that some water molecules will be lost from the system. This changes the potential for an evanescence wave, as the polar structures that are in the SPARC emulsion are removed by evaporation, thus affecting the transmission of energy. In addition, energy is stored within the rock and the interstices of the asphalt, which also changes the way that the energy moves through the substrate. It is therefore desirable to have a system configured to monitor such conditions, and that can also utilize feedback on how different Watt densities, different emitters, and changes in the components that are employed in the SPARC emulsion can maximize the use of the energy while minimizing potential damage to the pavement during homogenization of the interstices down to 3 inches in depth.

By analyzing data from experiments with different paving materials and different SPARC emulsion compositions, emitters can be constructed that work well with conventional asphalt concrete pavements, and that consume less than 20% of the power of heaters in conventional use for heating pavement, or even less energy (e.g., 5%). Such conventional methods include burning liquid propane gas using a ceramic blanket, or the more sophisticated open flame or catalyzed gas systems.

In one embodiment, the SPARC emulsion includes a birefringent or trirefringent material, and is provided in the form of a pre-manufactured film. The film is rolled over the surface of the pavement, e.g., from a spool, and then the HALO system is run over the top, yielding a sealed surface. It is desirable to avoid driving too much energy into isolated spots in the pavement where the energy is absorbed quickly, e.g., due to the higher permittivity of asphalt, water or other organic material such as rubberized asphalt. This can change the molecular structure of the elastomer (e.g., by basically pre-curing it—a negative consequence). The elastomer begins to melt and flow over the surface of the asphalt, such that blowing off of water or other volatiles is avoided. This results in a zero (defined by EPA as less than 1%) volatile organic carbon (VOC) repair process.

The SPARC-HALO systems typically generate about 0.1% VOC, which is highly desirable from an environmental standpoint and superior to many conventional processes which generate smoke and release large amounts of VOC.

Rock or very fine aggregate can be coated with SPARC elastomer and the elastomer can be pre-cured. The rock, which serves as a carrier of the SPARC elastomer, can then be placed due to its dry, free-flowing nature. By pre-firing the SPARC elastomer on a stone, e.g., in a plant, one can minimize the amount of energy one has to use in the field. Such a mixture would offer advantages over cold-mix asphalt in terms of ease of handling in the field. The material is pre-fired, taken to a jobsite, spread out, and then heated using the HALO system to yield a quality asphalt concrete pavement surface.

Oligopolymerization

In some embodiments, the radiation emitted by the heat shuttle is modulated to emit at least some radiation in the microwave region. This focuses heat on the asphalt between aggregate instead of the aggregate itself, essentially preheating the asphalt. This efficiently warms and disturbs the voids and interstices in the pavement without dehydrogenation of the asphalt. The process can also be employed to polymerize oligomers (approximately 2-150 repeating units) and other broken polymer chains in the aged asphalt, causing them to link into longer chains whereby ductility is improved. This process can be referred to as oligopolymerization, and can be utilized in a process of homogenization by liquid asphalt oligopolymerization (HALO). Core tests indicate that pavement thus treated is as much as 85% equivalent to the virgin asphalt binder originally found in the pavement in terms of: compressive strength, flexural compressive strength, and shear strength, compared to mere heating without oligopolymerization. Infrared radiation transitions to the microwave frequency at a wavelength of about 1 millimeter. When the wavelength gets shorter than 1 millimeter, the radiation is considered far infrared. Accordingly, for inducing oligopolymerization it is preferred to employ radiation wavelengths slightly longer than 1 millimeter.

The SPARC-HALO system is a noninvasive method of restoring the pavement to the highest possible physical properties, such that the asphalt exhibits characteristics similar to virgin asphalt ("rejuvenated asphalt").

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for repairing an asphalt pavement, comprising:
    preparing a surface of a damaged asphalt pavement comprising aged asphalt by filling in deviations from a uniform surface plane with dry aggregate and compacting the dry aggregate;
    applying a reactive asphalt emulsion to the prepared surface, whereby the reactive emulsion penetrates into cracks and crevices in the damaged asphalt pavement and into areas filled with the dry aggregate, wherein the reactive asphalt emulsion comprises butyl rubber, a diene modified asphalt, and an environmentally hardened bioresin, and wherein the reactive asphalt emulsion contains no perfluorocarbons or less than 1% perfluorocarbons as volatile components; and passing an emitter over the prepared pavement, wherein the emitter generates electromagnetic radiation having a wavelength of from 2-5 mm the radiation penetrating into the pavement to a depth of at least 2 inches, wherein a temperature differential throughout a top two inches of pavement is 100° F. or less, wherein a highest temperature in the top two inches of pavement does not exceed 300° F., and wherein a minimum temperature in the top two inches of pavement is at least 200° F., whereby voids and interstices in the damaged pavement are disturbed without dehydrogenation of the asphalt, and whereby oligomers present in the aged asphalt are linked together into longer polymer chains, whereby ductility of the aged asphalt is improved.

2. The method of claim 1, further comprising removing road reflectors, thermoplastic imprinting, and safety devices by mechanically removing prior to filling in deviations.

3. The method of claim 1, wherein the reactive asphalt emulsion further comprises a medium to high molecular weight polyisobutylene.

4. The method of claim 1, wherein the dry aggregate is precoated with an elastomeric composition, and wherein the reactive asphalt emulsion is at least partially cured so as to yield dry, free-flowing coated asphalt.

5. The method of claim 1, wherein a temperature differential throughout a top two inches of pavement is 50° F. or less.

6. The method of claim 1, wherein the emitter is a panel comprising a serpentine wire and a micaceous material through which the electromagnetic radiation generated by the emitter passes, and wherein the emitter produces electromagnetic radiation with a power density of from 0.47 to 2.33 $W/cm^2$ or from 133 to 664 $(ft \cdot lb_f/min)/in^2$.

7. The method of claim 1, wherein the oligomers possess 2-150 repeating units.

* * * * *

UNITED STATES PATENT AND TRADEMARK OFFICE
CERTIFICATE OF CORRECTION

PATENT NO.       : 8,992,118 B2  
APPLICATION NO.  : 13/842640  
DATED            : March 31, 2015  
INVENTOR(S)      : William B. Coe Page 1 of 1

It is certified that error appears in the above-identified patent and that said Letters Patent is hereby corrected as shown below:

IN THE SPECIFICATION

In column 9 at line 55, Change "glycerol," to --glycerol.--.

In column 13 at line 55, Change "having" to --having a--.

IN THE CLAIMS

In column 25 at line 11 (approx.), In Claim 1, change "2-5mm" to --2-5 mm,--.

Signed and Sealed this  
Twenty-ninth Day of December, 2015

Michelle K. Lee  
*Director of the United States Patent and Trademark Office*